United States Patent [19]

Shimoda et al.

[11] Patent Number: 5,489,655
[45] Date of Patent: Feb. 6, 1996

[54] THERMOSETTING RESIN COMPOSITIONS WITH LOW SHRINKAGE

[75] Inventors: Tomoaki Shimoda, Iwakuni; Kenichi Ishiwa, Oyama, both of Japan

[73] Assignee: General Electric Company, Pittsfield, Mass.

[21] Appl. No.: 67,446

[22] Filed: Jul. 26, 1993

[51] Int. Cl.⁶ .................................................. C08F 283/02
[52] U.S. Cl. ................... 525/462; 525/394; 525/461; 525/463; 525/439; 525/437; 525/467; 525/523; 525/533
[58] Field of Search .................... 525/394, 461, 525/462, 463, 439, 467, 437, 437, 523, 533

[56] References Cited

U.S. PATENT DOCUMENTS 3,098,056   7/1963   Schnell .................................. 525/463

FOREIGN PATENT DOCUMENTS 0275906   7/1988   European Pat. Off. .
0442047   8/1991   European Pat. Off. .

OTHER PUBLICATIONS

Database WPI Derwent Publications Ltd., London, GB; AN 91–003175 (01) & JP–A–2279710 (Nichiban KK) 15 Nov. 1990 *abstract*.

*Primary Examiner*—James J. Seidleck
*Assistant Examiner*—Terressa Mosley

[57] ABSTRACT

Thermosetting resin compositions with low shrinkage are provided, which when molded show low shrinkage rates, good dimensional stability (little cracking or warping), and excellent surface smoothness, mechanical strength, and dispersion stability.

The thermosetting resin compositions with low shrinkage in accordance with the present invention comprise:

(a) 100 wt. parts by weight thermosetting resins, and (b) 3 to 200 parts by weight polycarbonates containing constituent units derived from aromatic dihydroxy compounds.

The polycarbonates preferably have at least 5% (of all the terminal groups) terminal hydroxyl groups derived from aromatic dihydroxy compounds. The polycarbonates also preferably have an intrinsic viscosity of 0.05 to 0.65 dL/g.

12 Claims, No Drawings

THERMOSETTING RESIN COMPOSITIONS WITH LOW SHRINKAGE

BACKGROUND OF THE INVENTION

The present invention relates to thermosetting resin compositions with low shrinkage, specifically to thermosetting resin compositions having low shrinkage rates when molded, high dimensional stability (minimal cracking or warping), and good mechanical strength, surface smoothness, and dispersion stability.

DESCRIPTION OF THE RELATED ART

In general, thermosetting resins such as unsaturated polyester resins, phenolic resins, epoxy resins, urea resins, and melamine resins, are widely used for corrugated boards, pipes, rods, and other reinforced plastic products, as well as decorative boards, wiring boards, and other laminates, electric insulators, coatings, and adhesives. Molding materials containing each thermosetting resins, including general premixes, bulk molding compounds (BMC), dough molding compounds (DMC), and sheet molding compounds (SMC), are also known, and are used particularly in applications such as auto parts, electrical parts, communication equipment parts, precision machinery, trays, and boards.

These sorts of unsaturated polyesters and other thermosetting resins are known to show curing shrinkage rates of roughly 6–10% when they are molded and cured. Products obtained by curing and shrinking molding materials containing such thermosetting resins sometimes show problems such as cracking, shrink marking, or warping, poor surface smoothness, and surfacing of glass fibers in the molding, etc.

For this reason, thermoplastic resins are mixed with the unsaturated polyesters or other thermosetting resins in molding compositions as a way of decreasing their shrinkage thereof during molding. This nearly eliminates the problems of molded products described above. Thermosetting resin compositions with low shrinkage, comprising unsaturated polyester resins compounded with thermoplastic resins such as polystyrene or poly(methyl methacrylate), are disclosed, for example, in Japanese Early Patent Disclosure Publications No. 53-86791, 54-163991, 56-53120, 57-143315, 58-179213, 58-204014, etc.

However, in these cases, for example when polystyrene is used as the thermoplastic resin, the poor compatibility of polystyrene with the unsaturated polyester resin tends to cause polystyrene to separate out from the composition (compound), which can lead to major defects in products molded from it. Also, conventional molding compositions compounded with the types of thermoplastic resins mentioned above show a substantial lowering of mechanical strength, to 70–80% of the strength obtained without the thermoplastic component.

There has thus been a demand for thermosetting resin compositions which have good dispersion stability, so that the thermoplastic resin component does not separate out, as well as low shrinkage rates when molded, excellent dimensional stability, and good mechanical strength.

The present invention has been developed with these problems of conventional technology in mind. Its object is to provide thermosetting resin compositions which have good dispersion stability, so that the thermoplastic resin component does not separate out, as well as low shrinkage rates when molded, and which can form products with excellent dimensional stability and mechanical strength.

SUMMARY OF THE INVENTION

Thermosetting resin compositions with low shrinkage, in accordance with the present invention, comprise:
. 100 parts by weight thermosetting resin, and
. 3 to 200 parts by weight polycarbonate resin containing constituent units derived from aromatic dihydroxy compounds.

The polycarbonates used in the present invention are preferably ones in which at least 5% of all the terminal groups are hydroxy groups derived from aromatic dihydroxy compounds. The polycarbonates also preferably have intrinsic viscosities (measured at 20° C. in methylene chloride solution) of 0.05–0.65 dL/g.

Thermosetting resin compositions with low shrinkage in accordance with the present invention not only have good dispersion stability, but also show low shrinkage rates when molded, and excellent dimensional stability.

Thermosetting resin compositions with low shrinkage in accordance with the present invention can be molded into products having excellent surface smoothness and good mechanical strength.

Thermosetting resin compositions with low shrinkage in accordance with the present invention will now be explained more specifically.

Thermosetting resin compositions with low shrinkage in accordance with the present invention comprise
. thermosetting resin and
. polycarbonate resin containing constituent units derived from aromatic dihydroxy compounds.

There is no particular restriction on the type of thermosetting resins used in the present invention. They may be, for example, unsaturated polyester resins, phenolic resins, epoxy resins, urea resins, and melamine resins.

Unsaturated polyester resins used in the present invention may consist of the usual unsaturated polyesters obtained by reaction of polyhydric alcohols with polybasic acids including unsaturated acids as their essential component, and copolymerizable monomers, the unsaturated polyesters being dissolved in the monomers.

Specific examples of unsaturated acids which can be used to form the unsaturated polyesters include maleic anhydride, maleic acid, fumaric acid, itaconic acid, citraconic acid, chloromaleic acid, endo-methylenetetrahydrophthalic anhydride, hexachloro-endo-methylenetetrahydrophthalic anhydride, and halogenated phthalic anhydride, as well as their esters.

Examples of other polybasic acids include succinic acid, adipic acid, sebacic acid, azelaic acid, dodecanedioic acid, eicoic acid, isophthalic acid, and terephthalic acid, as well as their esters.

Examples of polyhydric alcohols include ethylene glycol, propylene glycol, diethylene glycol, dipropylene glycol, butanediol, neopentyl glycol, triethylene glycol, pentanediol, hexylene glycol, hydrogenated bisphenol A, bisphenol A-alkylene oxide adducts, tetrabromobisphenol A-alkylene oxide adducts, etc.

Examples of copolymerizable monomers used to formulate unsaturated polyester resins include styrene, α-methylstyrene, chlorostyrene, vinyltoluene, divinylbenzene, allyl phthalate, acrylate esters, and vinyl acetate.

Phenolic resins which can be used in the present invention include are derived from the usual phenols and aldehydes. Specific examples of such phenols include phenol, cresol, xylenol, tert-butylphenol, nonylphenol, cashew oil, lignin, resorcin, catechol, and.

Examples of aldehydes include formaldehyde, acetaldehyde, and furfural.

Epoxy resins which can be used in the present invention include:
- glycidyl ethers of bisphenol A, bisphenol F, tetrabromobisphenol A, tetraphenylolethane, phenol novolaks; o-cresol novolaks, polypropylene glycol, and hydrogenated bisphenol A;
- glycidyl esters of hexahydrophthalic anhydride, and dimer acids;
- glycidyl amine epoxy resins derived from diaminodiphenylmethane, isocyanuric acid, hydantoin, etc.;
- mixed glycidyl epoxy resins derived from p-aminophenol, or p-oxybenzoic acid;
- alicyclic epoxy resins.

Urea resins which can be used in the present invention are usually derived from urea and formaldehyde.

Melamine resins which can be used in the present invention are usually derived from melamine and formaldehyde.

Each of these types of thermosetting resins may be produced by known, conventional methods. The thermosetting resins used in the present invention are not limited to the specific examples listed above.

In the present invention, these thermosetting resins may be used singly or in combinations.

The polycarbonates used in the present invention, containing constituent units derived from aromatic dihydroxy compounds, will now be explained.

These polycarbonates have terminal groups of which usually at least 1%, preferably at least 5%, more preferably at least 10%, most preferably at least 15%, are hydroxy groups derived from aromatic dihydroxy compounds.

There is no particular restriction on the method used to produce polycarbonates of this type. They can be made by processes such as interfacial polymerization using aromatic dihydroxy compounds and phosgene, or melt polymerization (polycondensation) and solid-state polymerization using aromatic dihydroxy compounds and carbonate diesters. In the present invention it is preferable to use polycarbonates made by a melt process in which aromatic dihydroxy compounds and carbonate diesters undergo melt polycondensation in the presence of catalysts. Such a melt polymerization process makes it easy to obtain polycarbonates having the type of terminal groups specified above, and is also preferred from the standpoint of productivity.

This method of producing polycarbonates for use in the present invention by melt polymerization using aromatic dihydroxy compounds and carbonate diesters will now be explained.

Although there is no particular restriction on the type of aromatic dihydroxy compounds used, they may be compounds represented by the following formula (I)

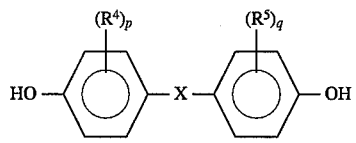

(where X is

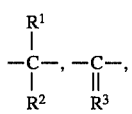

—O—, —S—, —SO—, or —SO$_2$—; R$^1$ and R$^2$ are hydrogen atoms or monovalent hydrocarbyl groups; R$^3$ is a divalent hydrocarbylene group; R$^4$ and R$^5$ are halogen atoms or monovalent hydrocarbyl groups wherein each of these substituents may be the same as or different from the others; and p and q are integers 0 to 4).

Specific examples of aromatic dihydroxy compounds represented by the above formula (I) include the following compounds.
- Bis(hydroxy aryl) alkanes such as bis(4-hydroxyphenyl)methane,
1,1-bis(4-hydroxyphenyl)ethane,
2,2-bis(4-hydroxyphenyl)propane,
2,2-bis(4-hydroxyphenyl)butane,
2,2-bis(4-hydroxyphenyl)octane,
bis(4-hydroxyphenyl)phenylmethane,
2,2-bis(4-hydroxy-1-methylphenyl)propane,
1,1-bis(4-hydroxy-tert-butylphenyl)propane,
2,2-bis(4-hydroxy-3-bromophenyl)propane, etc.
- Bis(hydroxy aryl) cycloalkanes such as
1,1-bis(4-hydroxyphenyl)cyclopentane,
1,1-bis(4-hydroxyphenyl)cyclohexane, etc.
- Dihydroxy diaryl ethers such as
4,4'-dihydroxydiphenyl ether,
4,4'-dihydroxy-3,3'-dimethyldiphenyl ether, etc.
- Dihydroxy diaryl sulfides such as
4,4'-dihydroxydiphenyl sulfide,
4,4'-dihydroxy-3,3'-dimethyldiphenyl sulfide, etc.
- Dihydroxy diaryl sulfoxides such as
4,4'-dihydroxydiphenyl sulfoxide,
4,4'-dihydroxy-3,3'-dimethyldiphenyl sulfoxide, etc.
- Dihydroxy diaryl sulfones such as
4,4'-dihydroxydiphenyl sulfone,
4,4'-dihydroxy-3,3'-dimethyldiphenyl sulfone, etc.

Of these various compounds, 2,2-bis(4-hydroxyphenyl)propane is preferably used.

Compounds represented by the following general formula (II) may also be used as the aromatic dihydroxy compounds.

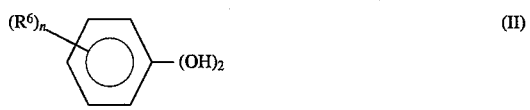

where n is an integer 0 to 4; and each R$^6$ is a hydrocarbyl group having 1 to 10 carbons, a halogenated hydrocarbyl group having 1 to 10 carbons, or a halogen atom. When n is 2 or more, the different R$^6$ groups may be the same or different.

Specific examples of aromatic dihydroxy compounds represented by this general formula (II) include
- Resorcin and substituted resorcins such as
3-methylresorcin, 3-ethylresorcin, 3-propylresorcin, 3-butylresorcin, 3-tert-butylresorcin, 3-phenylresorcin, 3-cumylresorcin, and 2,3,4,6-tetrafluororesorcin, 2,3,4,6-tetrabromoresorcin.
- Catechol
- Hydroquinone and substituted hydroquinones such as 3-methylhydroquinone, 3-ethylhydroquinone, 3-propylhydroquinone, 3-butylhydroquinone, 3-tert-butylhydroquinone, 3-phenylhydroquinone, 3-cumylhydroquinone, 2,3,5,6-tetramethylhydroquinone, 2,3,5,6-tetra-tert-butylhydroquinone, 2,3,5,6-tetrafluorohydroquinone, and 2,3,5,6-tetrabromohydroquinone.

Another aromatic dihydroxy compound which can be used in this invention is 2,2,2',2'-tetrahydro-3,3,3',3'-tetramethyl-1,1'-spirobi-(1H-indene)-6,6'-diol, represented by the following general formula

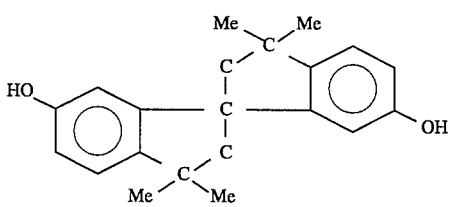

These aromatic dihydroxy compounds may be used singly or in combinations.

Specific examples of carbonate diesters include
diphenyl carbonate
ditolyl carbonate,
bis(chlorophenyl) carbonate,
m-cresyl carbonate,
dinaphthyl carbonate,
bis(diphenyl) carbonate,
diethyl carbonate,
dimethyl carbonate,
dibutyl carbonate, and
dicyclohexyl carbonate.

Of these, diphenyl carbonate is preferably used.

These carbonate diesters may be used singly or in combinations.

These carbonate diesters may also contain some (preferably 50 mole % or less, more preferably 30 mole % or less) dicarboxylic acids or dicarboxylate esters.

Examples of such dicarboxylic acids or dicarboxylate esters include:
. aromatic dicarboxylic acids or esters, such as terephthalic acid, isophthalic acid, diphenyl terephthalate, diphenyl isophthalate, etc.;
. aliphatic dicarboxylic acids or esters, such as succinic acid, glutaric acid, adipic acid, pimelic acid, suberic acid, azelaic acid, sebacic acid, decanedioic acid, dodecanedioic acid, diphenyl sebacate, diphenyl decanedioate, and diphenyl dodecanedioate; and
. alicyclic dicarboxylic acids or esters, such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, and diphenyl 1,4-cyclohexanedicarboxylate.

These types of dicarboxylic acids or dicarboxylate esters may be used singly or in combinations.

The aromatic dihydroxy compounds and carbonate diesters are supplied to the reaction system in such a way as to give polycarbonates having the desired molecular weight and terminal hydroxy group content.

In the production of polycarbonates in accordance with the present invention it is also possible to use polyfunctional compounds having three or more functional groups per molecule in addition to the aromatic dihydroxy compounds and carbonate diesters.

Such polyfunctional compounds preferably have phenolic hydroxyl or carboxyl groups. Compounds having 3 phenolic hydroxyl groups are particularly preferred. Specific examples include
1,1,1-tris(4-hydroxyphenyl)ethane,
2,2',2"-tris(4-hydroxyphenyl)diisopropylbenzene,
α-methyl-α,α',α"-tris(4-hydroxyphenyl)-1,4-diethylbenzene,
α,α',α"-tris(4-hydroxyphenyl)-1,3,5-triisopropylbenzene,
phloroglucin,
4,6-dimethyl-2,4,5-tri(4-hydroxyphenyl)heptane-2,
1,3,5-tri(4-hydroxyphenyl)benzene,
2,2-bis[4,4-(4,4'-dihydroxyphenyl)cyclohexyl]propane, trimellitic acid,
1,3,5-benzenetricarboxylic acid, and
pyromellitic acid.

Of these, 1,1,1-tris(4-hydroxyphenyl)ethane and α,α',α"-tris(4-hydroxyphenyl)-1,3,5-triisopropylbenzene are preferred.

The amount of polyfunctional compounds employed is usually up to 0.03 mole, preferably 0.001 to 0.02 mole, more preferably 0.001 to 0.01 mole, per mole of aromatic dihydroxy compounds.

In the present invention, the polycarbonates are preferably obtained by melt polycondensation of the aromatic dihydroxy compounds with the carbonate diesters in the presence of catalysts.

The compounds used as catalysts are preferably (a) alkali metal compounds and/or alkaline-earth metal compounds.

The alkali metal or alkaline-earth metal compounds are preferably organic acid salts, inorganic acid salts, oxides, hydroxides, hydrides, and alcoholates.

Specific examples of alkali metal compounds include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogen phosphate, dipotassium hydrogen phosphate, dilithium hydrogen phosphate, bisphenol A disodium salt, bisphenol A dipotassium salt, bisphenol A dilithium salt, sodium phenolate, and potassium phenolate, lithium phenolate, etc.

Specific examples of alkaline-earth metal compounds include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

These compounds may be used singly or in combinations.

The amount of such (a) alkali metal or alkaline-earth metal compounds used is $10^{-8}$ to $10^{-3}$ mole, preferably $10^{-7}$ to $2\times10^{-6}$ mole, per mole of aromatic dihydroxy compounds.

By using such (a) alkali metal or alkaline-earth metal compounds as catalysts, in amounts of $10^{-8}$ to $10^{-3}$ mole per mole of aromatic dihydroxy compounds, one can produce polycarbonates with high polymerization activity. The alkalinity of those compounds can be neutralized or at least attenuated by the addition of acidic compounds as described below, in amounts which do not adversely affect the polycarbonates.

In addition to these alkali metal compounds and/or alkaline-earth metal compounds, basic compounds (b) and/or borate compounds (c) may also be used as catalysts.

Examples of such (b) basic compounds include basic nitrogen compounds which are easily decomposd or volatilized at high temperatures. Specific examples of such compounds include the following.

- Ammonium hydroxides having alkyl, aryl, or alkaryl groups, such as tetramethylammonium hydroxide (Me$_4$NOH), tetraethylammonium hydroxide (Et$_4$NOH), tetrabutylammonium hydroxide (Bu$_4$NOH), and trimethylbenzylammonium hydroxide ($\phi$-CH$_2$(Me)$_3$NOH)
- tertiary amines such as trimethylamine, triethylamine, dimethylbenzylamine, and triphenylamine;
- secondary amines represented by R$_2$NH (where R is a methyl, ethyl, or other alkyl group, or a phenyl, tolyl, or other aryl group);
- primary amines represented by RNH$_2$ (where R is as above);
- nitrogen-containing heterocyclic compounds, such as 2-methylimidazole, 2-phenylimidazole, pyridine, dimethylaminopyridine, pyrimidine, pyrrole, oxazole, thiazole, pyrazole, 3-pyrroline, pyrrolidine, purine, quinoline, isoquinoline, carbazole, and nicotine; and
- ammonia and basic salts such as tetramethylammonium borohydride (Me$_4$NBH$_4$), tetrabutylammonium borohydride (Bu$_4$NBH$_4$), tetrabutylammonium tetraphenylborate (Bu$_4$NBPh$_4$), and tetramethylammonium tetraphenylborate (Me$_4$NBPh$_4$).

Of these, the tetraalkyl ammonium hydroxides, particularly electronic-grade tetraalkyl ammonium hydroxides having low levels of metallic impurities, are preferred.

When (b) nitrogen-containing basic compounds are used as catalysts, the amount of those compounds should be $10^{-6}$ to $10^{-1}$ mole, preferably $10^{-5}$ to $10^{-2}$ mole, per mole of aromatic dihydroxy compounds.

The (c) borate compounds may be boric acid, or borate esters.

Examples of borate esters include those represented by the following general formula $$B(OR)_n(OH)_{3-n}$$

where R is a methyl, ethyl, or other alkyl group or a phenyl or other aryl group; and n is 1, 2, or 3.

Specific examples of such borate esters include trimethyl borate, triethyl borate, tributyl borate, trihexyl borate, triheptyl borate, triphenyl borate, tritolyl borate, trinaphthyl borate, etc.

When (c) boric acid or borate esters are used as catalysts, the amount is $10^{-8}$ to $10^{-1}$ mole, preferably $10^{-7}$ to $10^{-2}$ mole, most preferably $10^{-6}$ to $10^{-4}$ mole, per mole of aromatic dihydroxy compounds.

The catalyst used is preferably a combination of the above-mentioned (a) alkali metal compounds and/or alkaline-earth metal compounds, and
(b) nitrogen-containing basic compounds;

or else a combination of the above-mentioned (a) alkali metal compounds and/or alkaline-earth metal compounds,
(b) nitrogen-containing basic compounds, and
(c) boric acid and/or borate esters.

Catalyst combinations of (a) alkali metal compounds and/or alkaline-earth metal compounds, and (b) nitrogen-containing basic compounds, in the amounts specified above, accelerate the polycondensation reaction to an adequate rate, making it possible to form polycarbonates of the desired molecular weight with high polymerization activity.

Use of the three-component catalyst combinations described above is preferred because they give polycarbonates which do not tend to show molecular weight loss during molding.

The polycondensation reaction of aromatic dihydroxy compounds with carbonate diesters can be carried out under the usual conditions for known polycondensation reactions.

The first-stage reaction between the aromatic dihydroxy compounds and carbonate diesters should be carried out at 80° to 250° C., preferably 100° to 230° C., more preferably 120° to 190° C., for a period of 0 to 5 hours, preferably 0 to 4 hours, more preferably 0 to 3 hours, at ambient pressure. Then the reaction between the aromatic dihydroxy compounds and the carbonate diesters should go further as the pressure in the reaction system is reduced and the reaction temperature increased, eventually reaching 5 mm Hg or less, preferably 1 mm Hg or less, and 140°–320° C.

The type of polycondensation reaction described above may be carried out continuously or batchwise. The apparatus used for this reaction may be tanks, tubular reactors, or reaction columns.

This sort of melt polymerization, the preferred process for producing polycarbonates in accordance with the present invention, is also preferable from the standpoint of environmental health and safety, since it does not involve the use of toxic materials such as phosgene or methylene chloride.

The polycarbonates thus obtained for use in the present invention should have an intrinsic viscosity, measured at 20° C. in methylene chloride, of 0.05 to 1.0 dL/g, preferably 0.05 to 0.65 dL/g, most preferably 0.05 to 0.50 dL/g.

Polycarbonates for use in the present invention have terminal groups of which usually at least 1%, preferably at least 5%, more preferably at least 10%, most preferably at least 15%, are hydroxyl groups derived from aromatic dihydroxy compounds. The following general formula (III) shows an example of such a terminal hydroxyl group when the aromatic dihydroxy compound used was 2,2-bis(4-hydroxyphenyl)propane.

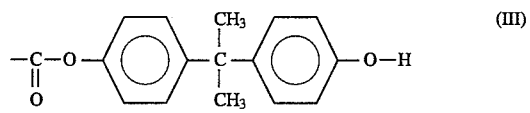
(III)

In the polycarbonates used in the present invention, the remaining terminal groups other than hydroxyl groups derived from aromatic dihydroxy compounds are usually phenoxy groups. They may also be groups represented by the following formulas (IV) or (V).

(IV)

(where R is an alkyl group having 5–50 carbons, which may be linear or branched, and may be halogenated) or ArO—                                (V)

(where Ar is an aromatic hydrocarbyl group having 6–50 carbons).

Terminal groups represented by these formulas (IV) and (V) may be formed by adding reactive aliphatic monocarboxy compounds or alkoxy compounds during production of the polycarbonates, as described in detail by the present applicants in the specification of Japanese Patent Application No. 3-159142.

The polycarbonate end groups can be determined by $^{13}$C-NMR.

Polycarbonates having terminal groups derived from aromatic dihydroxy compounds in the amounts specified above have excellent compatibility and affinity with thermosetting resins such as unsaturated polyester resins or epoxy resins. Consequently, when these polycarbonates are used, one obtains thermosetting resin compositions having excellent dispersion stability. Such thermosetting resin compositions can form molded products having excellent mechanical strength and surface smoothness.

It is extremely difficult to produce polycarbonates having the terminal hydroxy group content and molecular weight specified above by the usual phosgene process, given the nature of the polymerization reaction. On the other hand, as described above, melt polymerization of aromatic dihydroxy compounds with carbonate diesters makes it easy to produce polycarbonates having the terminal hydroxy group content and molecular weight specified above.

Thermosetting resin compositions in accordance with the present invention are usually formed by combining 100 parts by weight of the thermosetting resins with 3 to 200 parts, by weight preferably 5 to 100 parts by weight, of the polycarbonates, depending on the intended application.

There is no particular restriction on the method used to mix the thermosetting resins with the aromatic polycarbonate resin. Simple mechanical blending methods are easy. When an unsaturated polyester resin is used as the thermosetting resin, the polycarbonate can first be mixed and dispersed in the monomers (styrene, acrylate esters, etc.) used to formulate the unsaturated polyester resin, and then the unsaturated polyester can be mixed with and dissolved in the resulting monomer solution. This technique is preferred because it gives better dispersion of the polycarbonate and thermosetting resin.

In accordance with the present invention, the thermosetting resin compositions show excellent dispersion stability (the thermoplastic resin does not separate out from the composition), as well as low shrinkage rates during molding for good dimensional stability.

Thermosetting resin compositions with low shrinkage in accordance with the present invention can form molded products having excellent mechanical strength and surface smoothness.

The present invention will now be explained by means of some examples, although the invention is by no means limited to the examples cited here.

EXAMPLES

The intrinsic viscosity (IV) terminal hydroxyl group content, molding shrinkage, surface smoothness, and flexural strength were measured as follows.

Intrinsic Viscosity (IV)

This was measured in methylene chloride at 20° C., using a Uberode viscometer.

Terminal Group Ratios

The amounts of terminal phenoxy groups and of terminal hydroxyl groups derived from aromatic dihydroxy compounds were measured by $^{13}$C-NMR, and the ratio of terminal hydroxyl groups as a percentage of all the terminal groups was calculated.

Shrinkage

Shrinkage rates were evaluated by JIS K 6911 standard method. Specimens showing low shrinkage rates are indicated by ⊙, the others by x.

Surface Smoothness

Surface smoothness was evaluated visually. Specimens with good smoothness are indicated by ⊙, fair smoothness by Δ, and poor smoothness by x.

Flexural Strength

Specimens with good strength are indicated by ⊙, those with poor strength by x.

Reference Example 1

Under a stream of nitrogen, 98 wt. parts of maleic anhydride and 79.98 wt. parts of propylene glycol were heated to 215° C. to cause a condensation reaction, which was continued until the acid value reached 29. Then 70 wt. parts of the resulting unsaturated polyester were dissolved in 30 wt. parts of styrene containing 0.01 wt. part of hydroquinone to give an unsaturated polyester resin.

Reference Example 2

To a 250-liter stirred tank were charged 0.44 kilomole of bisphenol A (from Nihon GE Plastics) and 0.46 kilomole of diphenyl carbonate (from Enii Ltd.). The mixture was melted at 140° C., and additional bisphenol A and diphenyl carbonate were fed at 0.16 kilomole/hour each to maintain the level in the tank as the mixed solution was passed at a rate of 0.16 kilomole/hour (bisphenol A equivalent) to a 50-liter second stirred tank, where the temperature was kept at 180° C.

A catalyst stream of 0.04 mole/hour of tetramethylammonium hydroxide and 0.00016 mole/hour ($1 \times 10^{-6}$ mole/mole bisphenol A) of sodium hydroxide was added to the stirred mixture, whose level was controlled to give a residence time of 30 minutes.

The resulting reaction mixture was passed at a rate of 0.16 kilomole/hour (bisphenol A equivalent) to a 50-liter third stirred tank operating at 210° C. and 200 mm Hg, from which phenol was distilled off as the level was controlled to give a residence time of 30 minutes.

This reaction mixture was in turn passed at 0.16 kilomole/hour (bisphenol A equivalent) to a 50-liter fourth stirred tank operating at 240° C. and 15 mm Hg, from which phenol was distilled off as the level was controlled to give a residence time of 30 minutes. When the reactor came to steady state, the intrinsic viscosity of the reaction product was 0.15 dL/g, and the resin had 45% hydroxy terminal groups.

The reaction product was pressurized by a gear pump and fed at 0.16 kilomole/hour (bisphenol A equivalent) to a centrifugal thin-film evaporator for further reaction at 270° C. and 2 mm Hg. Resin sampled from the bottom of the evaporator had an intrinsic viscosity of 0.35 dL/g and 25% hydroxy terminal groups. That product was passed by a gear pump at 0.16 kilomole/hour (bisphenol A equivalent; roughly 40 kg/hour) to a horizontal stirred tank polymerization reactor (L/D=3, stirrer blade diameter 220 mm, volume 80 liters) operating at 290° C. and 0.2 mm Hg, with a residence time of 30 minutes, where it was further polymerized. The resulting polymer an intrinsic viscosity of 0.49 dL/g, and 15% hydroxy terminal groups.

Reference Example 3

Forty parts by weight of the polycarbonate with intrinsic viscosity 0.49 dL/g obtained in Reference Example 2 was mixed with 60 wt. parts of styrene to give a polycarbonate solution (A).

Reference Example 4

Forty wt. parts of the polycarbonate with intrinsic viscosity 0.35 dL/g obtained in Reference Example 2 was mixed with 60 parts by weight of styrene to give a polycarbonate solution (B).

Reference Example 5

Forty parts by weight of the polycarbonate with intrinsic viscosity 0.15 dL/g obtained in Reference Example 2 was mixed with 60 parts by weight of styrene to give a polycarbonate solution (C).

Reference Example 6

Forty parts by weight of a polycarbonate produced by the phosgene process, with intrinsic viscosity 0.49 dL/g and 99% hydroxy terminal groups (Lexan 140-111, from Nihon GE Plastics), was mixed with 60 parts by weight of styrene to give a polycarbonate solution (D). The concentration of terminal hydroxy groups in this resin was 1%.

Examples 1 to 4

The components listed in Table 1 were kneaded in the proportions indicated at 140° C. and 30 kg/cm$^2$ for 3 minutes to form a bulk molding compound.

The results are shown in Table 1.

Comparison 1

The components listed in Table 1 were kneaded in the proportions indicated at 140° C. and 30 kg/cm$^2$ for 3 minutes to form a bulk molding compound.

The results are shown in Table 1.

TABLE 1

|  | Ex. 1 | Ex. 2 | Ex. 3 | Ex. 4 | Comp. 1 |
|---|---|---|---|---|---|
| Component (wt. parts) | | | | | |
| Unsaturated Polyester Resin | 70 | 70 | 70 | 70 | 100 |
| Polycarbonate Solution (A) | 30 | — | — | — | — |
| Polycarbonate Solution (B) | — | 30 | — | — | — |
| Polycarbonate Solution (C) | — | — | 30 | — | — |
| Polycarbonate Solution (D) | — | — | — | 30 | — |
| Benzoyl Peroxide | 2 | 2 | 2 | 2 | 2 |
| Zinc Stearate | 2 | 2 | 2 | 2 | 2 |
| Calcium Carbonate | 150 | 150 | 150 | 150 | 150 |
| ¼-inch Glass Fibers | 20 | 20 | 20 | 20 | 20 |
| Properties | | | | | |
| Shrinkage | ⊙ | ⊙ | ⊙ | ⊙ | X |
| Surface Smoothness | ⊙ | ⊙ | ⊙ | Δ | X |
| Flexural Strength | ⊙ | ⊙ | ⊙ | Δ | ⊙ |

What is claimed is:

1. A thermosetting resin composition comprising:

a) 100 parts by weight of a thermosetting resin selected from the group consisting of unsaturated polyester resins, phenolic resins, urea resins and melamine resins, and b) 3–200 parts by weight of a polycarbonate resin having at least 5% hydroxy terminal groups derived from an aromatic dihydroxy compound, wherein the polycarbonate resin has an intrinsic viscosity measured at 20° C. in methylene chloride of 0.05–1.0 dl/g.

2. A thermosetting resin composition as in claim 1, wherein the polycarbonate resin has at least 5 percent hydroxy terminal groups derived from the aromatic dihydroxy compound.

3. A thermosetting resin composition as in claim 1, wherein the polycarbonate resin has an intrinsic viscosity, measured at 20° C. in methylene chloride, of 0.05 to 0.65 dL/g.

4. A thermosetting resin composition as in claim 1, wherein the polycarbonate resin has at least 10 percent hydroxy terminal groups derived from the aromatic dihydroxy compound.

5. A thermosetting resin composition as in claim 1, wherein the polycarbonate resin has at least 15 percent hydroxy terminal groups derived from the aromatic dihydroxy compound.

6. The composition of claim 1 wherein said polycarbonate resin is produced by melt polymerization of an aromatic dihydroxy compound with carbonate diesters.

7. The composition of claim 1 wherein said aromatic dihydroxy compound is 2,2-bis(4-hydroxy phenol) propane.

8. The composition of claim 1, comprising 5 to 100 parts by weight of the polycarbonate resin.

9. The composition of claim 1, wherein said composition consists essentially of said thermosetting resin and said polycarbonate resin.

10. The composition of claim 1, wherein said composition consists of said thermosetting resin and said polycarbonate resin.

11. A product molded from the composition of claim 1.

12. A product as claimed in claim 11, wherein said product is selected from the group consisting of building materials, automobile parts, electrical parts, communication equipment parts, precision machinery, trays and boards.

* * * * *